United States Patent
Harnisch

(10) Patent No.: US 7,019,833 B2
(45) Date of Patent: Mar. 28, 2006

(54) MINIATURE OPTICAL SPECTROMETER

(75) Inventor: Bernd Harnisch, Noordwijkerhout (NL)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 10/892,832

(22) Filed: Jul. 15, 2004

(65) Prior Publication Data
US 2005/0046839 A1    Mar. 3, 2005

(30) Foreign Application Priority Data
Jul. 16, 2003    (FR)    ................... 03 08688

(51) Int. Cl.
G01J 3/28    (2006.01)

(52) U.S. Cl. .................................... 356/328

(58) Field of Classification Search ................ 356/326, 356/328, 419
See application file for complete search history.

(56) References Cited

U.S. PATENT DOCUMENTS

| 3,447,873 | A | 6/1969 | Keahl et al. |
| 5,420,681 | A | 5/1995 | Woodruff |
| 5,859,702 | A | 1/1999 | Lindblom |
| 6,057,925 | A | 5/2000 | Anthon |
| 6,556,301 | B1 * | 4/2003 | Carter ........................ 356/419 |
| 2001/0028458 | A1 * | 10/2001 | Xiao .......................... 356/419 |

* cited by examiner

Primary Examiner—F. L. Evans
(74) Attorney, Agent, or Firm—Cohen, Pontani, Lieberman & Pavane

(57) ABSTRACT

A high resolution spectrometer with a large free spectral range comprising an entrance slit for a beam of electromagnetic radiation to be analyzed, a first dispersion device for dispersing the beam to be analyzed into various wavelength components in a first direction, a second dispersion device for dispersing each wavelength component output from the first dispersion device in a second direction, and an imaging device comprising a sensitive detection spectrum surface on which the beam dispersed in the first and second directions is focused, the first dispersion device being an optical filter that varies linearly and has a surface on which the beam to be analyzed is focused, each point on the surface of the filter operating like a pass band filter with a central frequency varying linearly in the first direction.

11 Claims, 5 Drawing Sheets

MINIATURE OPTICAL SPECTROMETER

BACKGROUND OF THE INVENTION

This invention relates to the domain of optical instrumentation and in particular the domain of optical spectrometers working with a large free spectral range combined with a high spectral resolution.

It is particularly but not exclusively applicable to optical spectrometers for installation in space exploration vessels and in a rover for planetary exploration.

High spectral resolution spectrometers usually comprise an entry slit for the electromagnetic radiation beam to be analyzed, a collimator to conform the beam that penetrated through the slit so as to make the rays of the beam parallel, a dispersion device such as a prism and/or grating to decompose the beam into parallel rays depending on its different wavelength components in wavelength dependent directions, and an imaging device to focus all the parallel rays on a wavelength dependent position onto a detector.

A specific class of spectrometer with a combination of high spectral resolution and a large free spectral range is the Echelle spectrometer. In such a spectrometer, the radiation beam applied to the entrance slit is collimated by a first set of lenses, then the collimated beam is dispersed by a first dispersion device in a first direction, followed by a second dispersion device which disperse each component output from the first dispersion device once again in direction perpendicular to the first direction, and an imaging device comprising a set of lenses to focus the beam output from the second dispersion device onto a sensitive surface of a sensor on which an image of the entrance slit is formed for each spectral component of the radiation transmitted by the entrance slit. Usually, the first dispersion device is a prism and the second dispersion device is a diffraction grating decomposing the beam by reflection. An example of a spectrometer of this type is described in U.S. Pat. No. 5,859,702.

In order to obtain a high spectral resolution with a large free spectral range, the diffraction grating is used with a high diffraction order, typically of the order of 100, while the prism is used with a low diffraction order to avoid overlapping of the different diffraction orders of the grating.

Particularly due to the presence of a prism, this type of spectrometer is large and heavy which makes it unusable for space planetary missions. This disadvantage is particularly bothersome because the prism must be relatively large so as to be able to process a large free spectral range and to prevent overlapping of the diffraction orders.

Furthermore, the use of diffraction gratings at high diffraction orders is required by the high spectral resolution.

The use of a prism as a first dispersion device makes it necessary to use a collimator.

Besides, linearly variable optical filters have been developed composed of a transparent substrate, one face of which is covered by a multi-layer structure deposited under a vacuum, with a small thickness that varies linearly in one direction and is constant in a perpendicular direction. When a beam is applied on the filter, the wavelength band that passes through the filter depends on the thickness of the multilayer structure and thus on the location at which the beam is applied.

This type of filter is used in a color measurement spectrometer described in patent U.S. Pat. No. 6,057,925 to select a wavelength band within the spectrum to be analyzed and to image it onto the detector. The spectral resolution of this spectrometer is limited to the spectral transmission of the linearly variable optical filter, which is in the order of 10 nm Full-Width-Half-Maximum (FWHM) in the visible wavelength domain. This low spectral resolution is insufficient to analyze atomic emission lines, which require a spectral resolution equal or better than 0.1 nm.

SUMMARY OF THE INVENTION

The purpose of this invention is to propose a spectrometer that combines a large free spectral range of wavelengths with a high spectral resolution, and with lower weight and smaller size than spectrometers of prior art with competing optical performances. This objective is achieved by provision of a high resolution spectrometer comprising an entry or entrance aperture for a beam of electromagnetic radiation to be analyzed, a first dispersion device for dispersing the beam to be analyzed into various wavelength components in a first direction, a second dispersion device for dispersing each wavelength component output from the first dispersion device in a second direction, and an imaging device comprising a sensitive detection spectrum surface on which the beam dispersed in the first and second directions is focused, wherein the first dispersion device is an optical filter that varies linearly and has a surface on which the beam to be analyzed is focused, each point on the surface of the filter operating like a pass band filter with a central frequency varying linearly in the first direction.

Advantageously, the second dispersion device is a diffraction grating.

According to a preferred embodiment, the first and second directions are perpendicular.

According to a preferred embodiment, the first and second directions are selected in order to reduce the dimensions of the sensitive detection surface.

According to a preferred embodiment, the orientation of the sensitive detection surface relative to the second direction is selected so as to reduce the dimensions of the sensitive detection surface.

According to a preferred embodiment, this spectrometer further comprises a collimating device through which the decomposed beam along the first direction passes, before being decomposed by the second dispersion device.

According to a preferred embodiment, the entrance aperture for the beam to be analyzed consists of a slit.

Advantageously, the first dispersion device is adjacent to the slit.

Alternatively, the entrance aperture for the beam to be analyzed is formed by the end of a harness of optical fibers that carry the beam to be analyzed, the end of the optical fiber harness being conformed such that it has the shape of a slit.

According to a preferred embodiment, the first dispersion device is in contact with the end of the harness of optical fibers.

According to a preferred embodiment, the characteristics of the first dispersion device are suitable for the dimensions of the sensitive detection surface.

BRIEF DESCRIPTION OF THE DRAWINGS

Preferred embodiments of the invention will be described below as a non-limitative example with reference to the attached drawings in which:

FIG. 1b schematically shows a cross-sectional view of the spectrometer shown in FIG. 1a;

DETAILED DESCRIPTION OF THE PREFERRED EMBODIMENTS

Figure 1A:
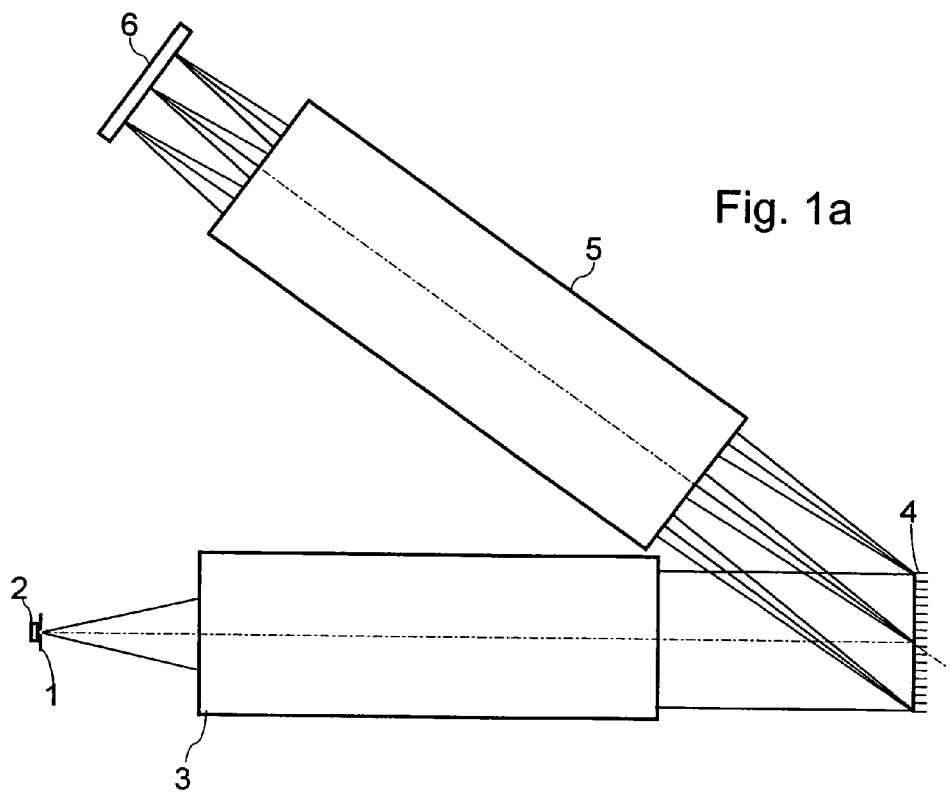
FIG. 1a schematically shows a side view of a spectrometer according to the invention.
Figure 1B:
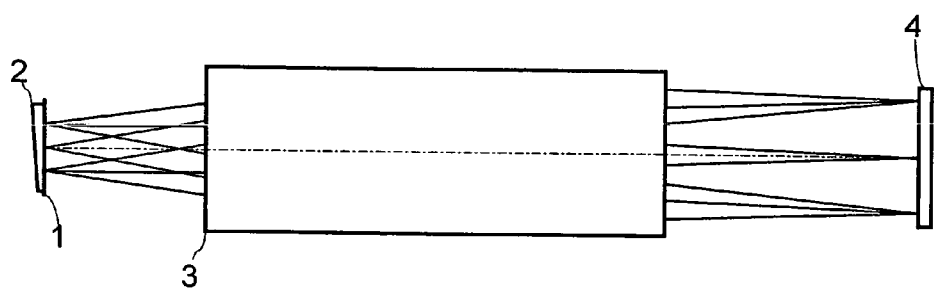

FIGS. 1a and 1b show a spectrometer comprising:
- an entry mask 1 in which a slit is formed on which a beam of the electromagnetic radiation to be analyzed is applied,
- a first dispersion device 2 to pre-disperse the beam originating from the slit in its different wavelength components in the direction of the slit (located in the plane of FIG. 1a),
- a second dispersion device 4 to disperse the pre-dispersed beams originating from different position of the slit in a different direction than the slit direction, and
- an imaging device 5 comprising a sensitive surface 6 of an image sensor to which the beam dispersed by the dispersion device 2 and 4 is focussed, to generate an image of the spectrum of the beam applied at the entry to the spectrometer.

According to the invention, the first dispersion device 2 is located at the entry slit, preferably on the input side of the entry slit to pre-disperse (relatively lowly compared with the dispersion done by the dispersion device 4) the components of the wavelengths of the input beam in a dispersion direction different from the second dispersion direction, for example perpendicular to it (located in the plane of FIG. 1b).

In this way, the image formed on the sensitive surface 6 of the image sensor is a two-dimensional image representing the spectrum of the incident beam dispersed in two different directions.

The second dispersion device 4 is advantageously a diffraction grating decomposing the incident beam by reflection or refraction, towards the imaging device. It might also be a prism or a grism, which is a combination of a prism and a grating.

If the second dispersion device 4 is reflective, the optical axis of the imaging device forms an acute angle with respect to the optical axis connecting the slit 1 to the first dispersion device 2.

For example, the image sensor may be of the CCD (Charge-Coupled Device) type.

A collimating device 3 may be provided to illuminate the second dispersion device 4 with a beam output from the slit for which the rays are parallel to each other.

The second dispersion device 4 can also be conformed as an imaging grating so as to focus the beam directly onto the sensitive surface 6 of the sensor without the need of a collimating device 3 and an imaging device 5. Consequently, the diffraction grating may be made on a spherical or toroidal mirror surface.

Figure 2A:
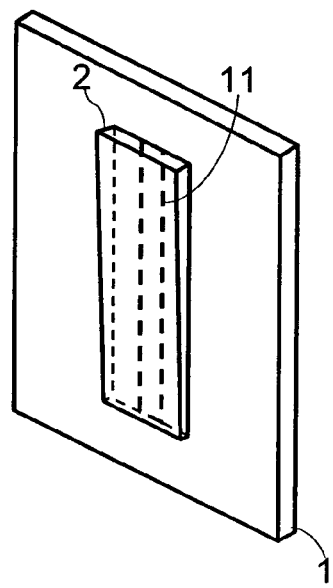
FIGS. 2a and 2b show more details of a perspective view of the front and back respectively of the entrance slit of the spectrometer shown in FIG. 1.
Figure 2B:
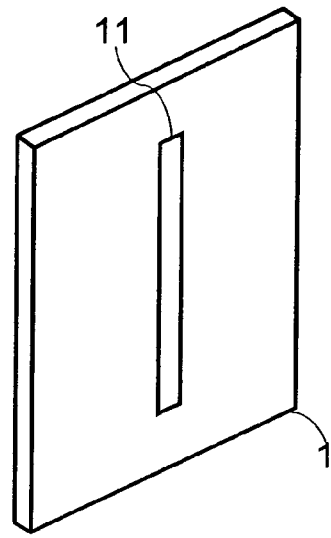

As shown in FIG. 2a, the first dispersion device 2 according to the invention is composed of an LVF (Linear Variable Filter) optical filter. This optical filter comprises a thin multilayer structure deposited under a vacuum, having a thickness which varies linearly in the direction along the slit 1 and which is constant in the direction perpendicular to the direction of the slit (it shall be mentioned that the linear variation of the coating thickness has been exaggerated for better visibility). This structure may be formed on a transparent substrate, for example made of glass.

Each point on the surface of such a filter operates like a pass band filter, for which the pass band depends on the thickness of the multilayer structure at this point, and for which the central frequency varies linearly in the direction of the gradient in the multilayer structure.

For the demonstrated example the filter chosen has a Full Width Half Maximum (FWHM) pass band width at each point on its surface equal to 10 nm, and a gradient (variation of thickness and central frequency of the pass band) of the order of 40 to 60 nm per mm.

Figure 3:
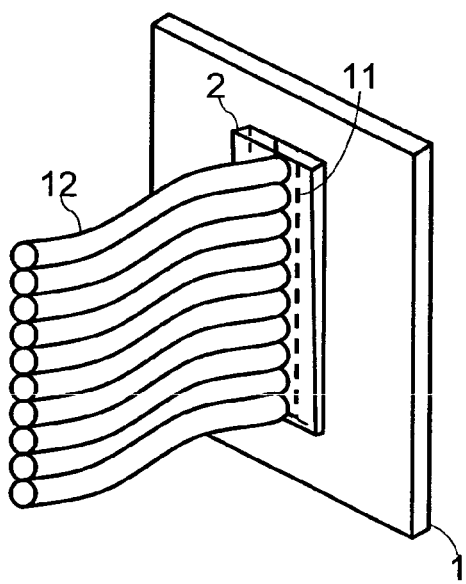
FIG. 3 shows a perspective front view of a variant of the slit shown in FIG. 2a, according to the invention.

In FIG. 3, the incident beam to be analyzed is carried to the level of the slit 11 by a harness 12 of optical fibers. The multilayer structure of the optical filter 2 may be formed on a transparent substrate inserted between the slit 11 and the output end of the harness 12 of optical fibers.

The multilayer optical filter structure 2 may also be formed directly on the output end of the harness 12 of optical fibers that is polished for this purpose.

The slit 11 may also be eliminated, provided that the input beam to be analyzed is delimited by the contour at the output end of the harness 12 of optical fibers.

The ends of the fibers 12 may be conformed so as to have a tapered shape in which the end diameter corresponds to the width and shape of the slit 11.

Figure 4A:
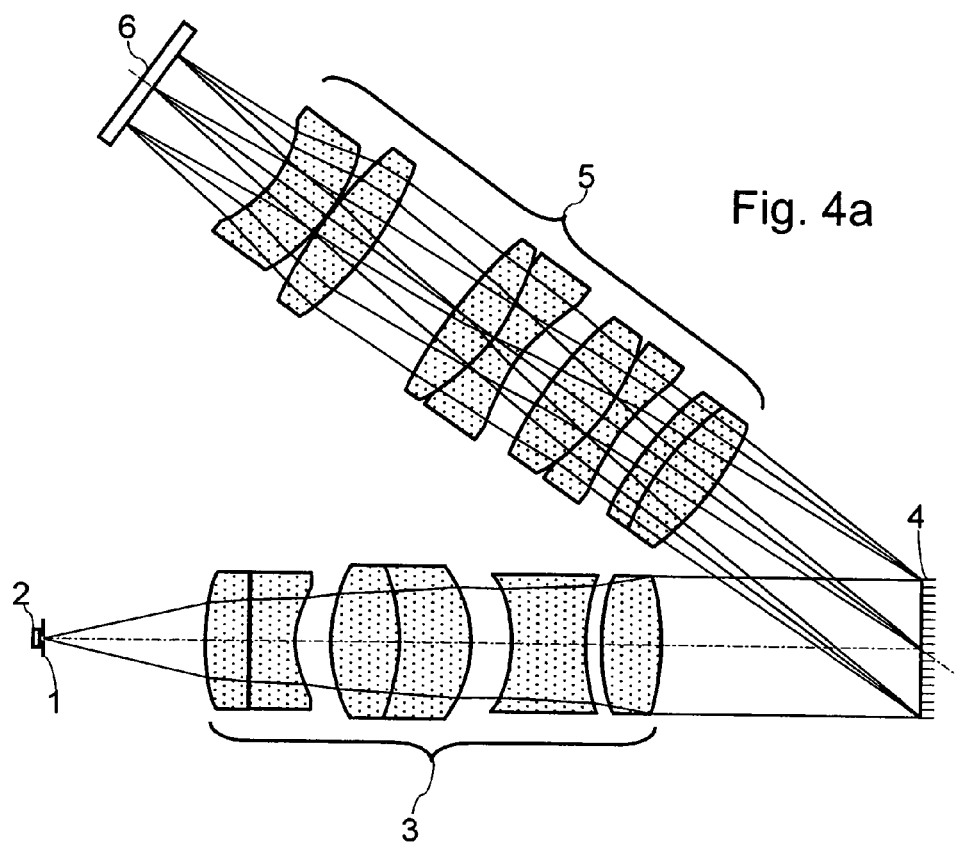
FIGS. 4a and 4b show side and cross-sectional views respectively of a variant of the spectrometer shown in FIG. 1.
Figure 4B:
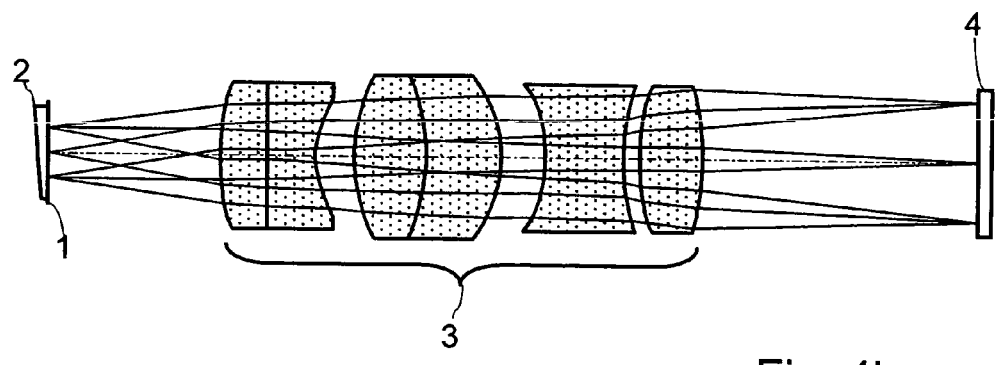

The spectrometer shown in FIGS. 4a and 4b comprises a collimator 3 made using a system of lenses, a plane and reflecting diffraction grating 4 associated with an imaging device 5 such as a camera objective to focus the diffracted beam originating from the diffraction grating onto the sensitive surface 6 of the sensor.

Figure 5:
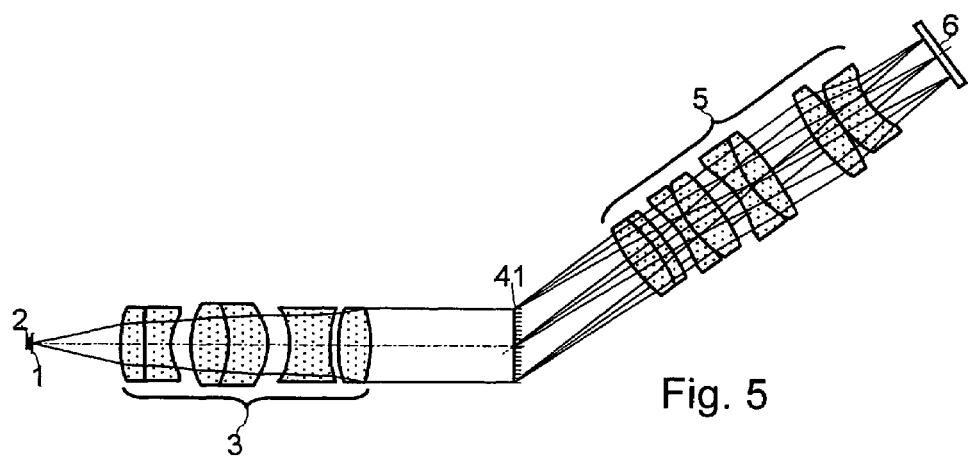
FIGS. 5 and 6 show a side view of two other embodiments of the spectrometer according to the invention.

The spectrometer shown in FIG. 5 corresponds to the spectrometer shown in FIGS. 4a and 4b, except that the diffraction grating 41 is transmissive instead of being reflective.

Figure 6:
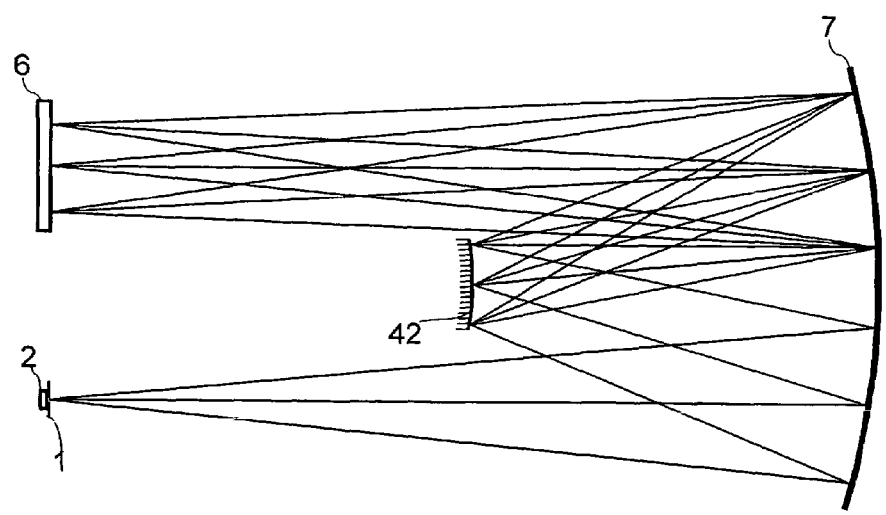

The spectrometer shown in FIG. 6 comprises a spherical mirror 7 that converges the beam output from the mask 1 after passing through the slit 11 towards the diffraction grating 42. The shape of the diffraction grating is convex spherical to create a divergent beam focused on the sensitive surface of the sensor 6 through a mirror that may advantageously be the mirror 7 used to cause convergence of the beam output from the slit onto the diffraction grating 42.

This lens-free embodiment has the advantage that it eliminates chromatic aberrations. However, reflective elements are larger than refractive elements, and the resolution obtained by such a spectrometer is less than the resolution obtained by the spectrometer illustrated in FIGS. 4a and 4b.

The spectrometer illustrated in FIGS. 4a and 4b may be designed to analyze spectra, for example in the 230 nm to 430 nm UV band, or in the 450 to 900 nm visible band. For example, the characteristics of this spectrometer may be as follows for the UV band:
- an LVF filter with a gradient of 0.40 nm/mm and a pass band width (FWHM) at each point equal to 10 nm, a slit length equal to 5 mm, a sensitive surface 6 of the CCD sensor with a pixel step of 7 µm, and an optical system with a magnification ratio between the entrance slit and the sensor equal to 1; in other words the width of the image of the slit on the sensitive surface of the sensor is equal to the width of the slit.

These characteristics make it possible to achieve a spectral resolution of the order of 0.1 nm, and more precisely 0.09 nm for wavelengths less than 320 nm and 0.13 nm for wavelengths greater than 320 nm in the band of wavelengths considered. The first spectral resolution corresponds to a diffraction order of 4 in the diffraction grating, whereas the second spectral resolution corresponds to a diffraction order of 3.

The mass of the optical part of this spectrometer is less than 150 g, and its volume is less than 70 cm$^3$.

Considering these spectrometer characteristics, the sensitive surface of the image sensor must include at least (5 mm/7 µm=) 715 pixels along the direction of the slit and about (200 nm/0.1 nm =) 2000 pixels along a direction perpendicular to the direction of the slit, which corresponds to a sensitive surface of the sensor equal to at least 5 mm×14 mm.

Figures 7A, 7B:
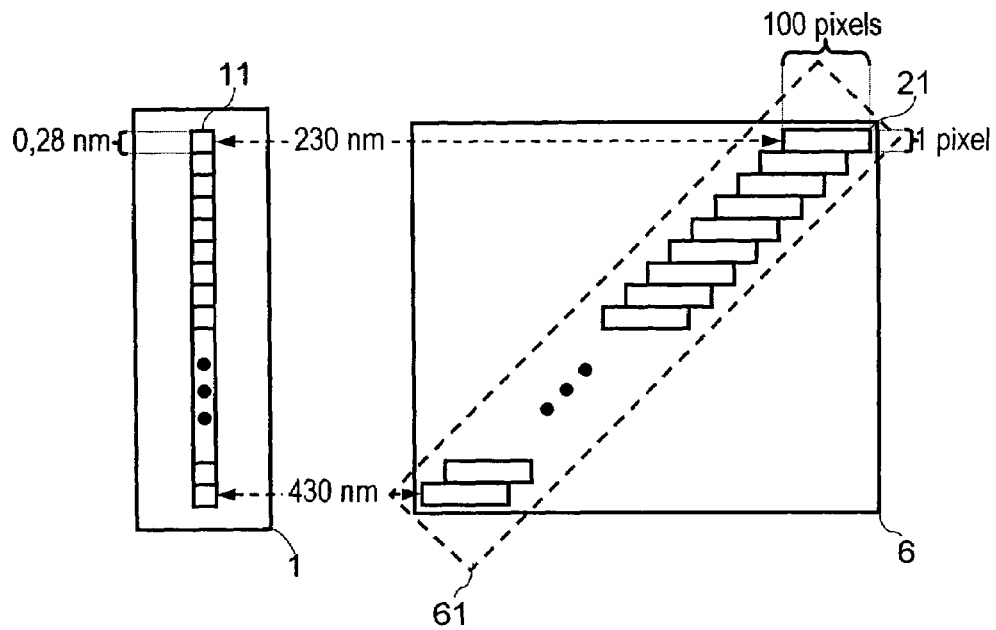
FIGS. 7a and 7b show a front view of the slit and the shape of the image obtained on the sensitive surface of the image sensor, respectively.

FIG. 7b shows the shape of the images obtained by such a spectrometer, compared with the dimensions of the slit 11 shown at the same scale in FIG. 7a. As shown in FIG. 7b, the pixels providing significant information about the radiation spectrum applied to the slit entry are mostly localized in bands 21, which are 7 µm (=1 pixel) high and 700 µm (=100 pixels) wide corresponding to the width of the filter pass band (FWHM=10 nm) at a given point of the optical filter 2 aiming at a spectral resolution of 0.1 nm or better. Each band 21 is offset from the previous band by 7 µm, which is equal to 1 pixel in vertical resolution, and corresponds to a difference in the wavelength of 0.28 nm (7 µm×40 nm/mm). In FIG. 7b, each column of pixels (along the direction of the slit 11) of the image thus obtained corresponds to the same wavelength of the beam analyzed.

In order to reduce the necessary sensitive surface area 6 of the sensor, the surface may be inclined at a suited angle from the direction of the slit 11 or the end of the harness 12 of optical fibers, to compensate for the inclination of the pattern formed by the bands 21 on the sensor. The minimum shape and arrangement of the sensitive surface 61 of the sensor are shown in broken lines in FIG. 7b.

In order to achieve this, the slit 11 and possibly the optical filter 2 may alternately be inclined by a suited angle with respect to the dispersion direction of the diffraction grating 4.

Figures 8A, 8B:
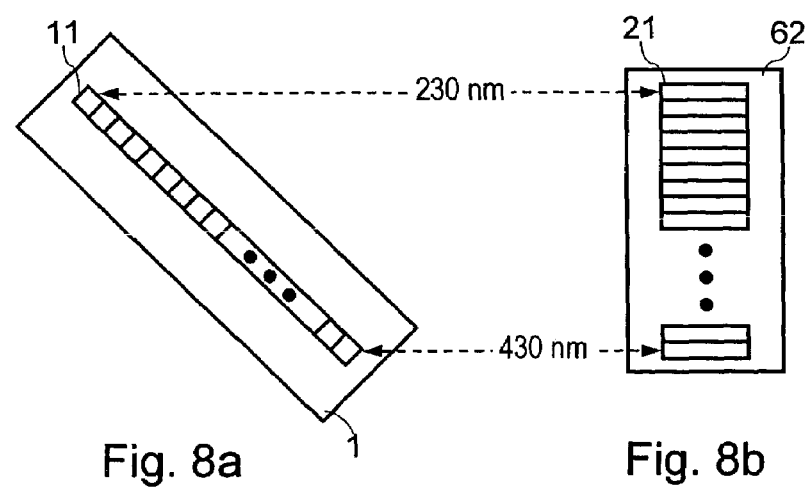
FIGS. 8a and 8b show a front view of the shape of the slit and the shape of the image obtained on the sensitive surface of the image sensor respectively, according to a variant embodiment of the invention.

FIG. 8b shows the shape of the images obtained by such a spectrometer, compared with the dimensions and inclination of the slit 11 shown at the same scale in FIG. 8a.

In this manner, the bands 21 can be imaged in a rectangular area on the sensitive surface 62 of the sensor.

It can be seen that in the embodiment illustrated in FIGS. 8a and 8b, the lines formed on the sensitive surface 62 by the diffraction grating 4 are closer together than in the embodiment shown in FIGS. 7a and 7b due to the fact that the optical filter 2 pre-disperses the incident beam such that the angle between the incident beam and the dispersion made by the diffraction grating is not a right angle.

Note also that the characteristics of the filter 2, and particularly the width of its pass band (FWHM), and the filter gradient can be varied to adapt the spectrometer to the dimensions of the sensitive surface of the sensor 6.

What is claimed is:

1. A high resolution spectrometer comprising an entrance aperture for a beam of electromagnetic radiation to be analyzed, a first dispersion device for dispersing the beam to be analyzed into various wavelength components in a first direction, a second dispersion device for dispersing each wavelength component output from the first dispersion device in a second direction, and an imaging device comprising a sensitive detection spectrum surface on which the beam dispersed in the first and second directions is focused, wherein the first dispersion device is an optical filter that varies linearly and has a surface on which the beam to be analyzed is focused, each point on the surface of the filter operating like a pass band filter with a central frequency varying linearly in the first direction.

2. The spectrometer according to claim 1, wherein the second dispersion device is a diffraction grating.

3. The spectrometer according to claim 1, wherein the first and second directions are perpendicular.

4. The spectrometer according to claim 1, wherein the first and second directions are selected in order to reduce the dimensions of the sensitive detection surface.

5. The spectrometer according to claim 1, wherein the orientation of the sensitive detection surface relative to the second direction is selected so as to reduce the dimensions of the sensitive detection surface.

6. The spectrometer according to claim 1, further comprising a collimating device through which the decomposed beam along the first direction passes, before being decomposed by the second dispersion device.

7. The spectrometer according to claim 1, wherein the entrance aperture for the beam to be analyzed consists of a slit.

8. The spectrometer according to claim 7, wherein the first dispersion device is adjacent to the slit.

9. The spectrometer according to claim 1, wherein the entrance aperture for the beam to be analyzed is formed by the end of a harness of optical fibers that carry the beam to be analyzed, the end of the optical fiber harness being conformed such that it has the shape of a slit.

10. The spectrometer according to claim 9, wherein the first dispersion device is in contact with the end of the harness of optical fibers.

11. The spectrometer according to claim 1, wherein the characteristics of the first dispersion device are suitable for the dimensions of the sensitive detection surface.

* * * * *